United States Patent [19]

Schmidt et al.

[11] Patent Number: 4,636,531

[45] Date of Patent: Jan. 13, 1987

[54] PROCESS FOR THE PREPARATION OF OPTIONALLY CELLULAR POLYURETHANE POLYUREA MOLDED PARTS WITH IMPROVED DEMOLDING CHARACTERISTICS

[75] Inventors: Hans U. Schmidt, Ludwigshafen; Frank Werner, Neustadt, both of Fed. Rep. of Germany

[73] Assignee: BASF Aktiengesellschaft, Ludwigshafen, Fed. Rep. of Germany

[21] Appl. No.: 700,633

[22] Filed: Feb. 13, 1985

[30] Foreign Application Priority Data

Feb. 17, 1984 [DE] Fed. Rep. of Germany ....... 3405680

[51] Int. Cl.$^4$ .................... C08G 18/14; C08G 18/32; B29C 67/22

[52] U.S. Cl. .................................. 521/163; 264/45.3; 264/45.5; 264/53; 264/54; 264/300; 264/328.6; 264/DIG. 83; 428/315.5; 428/318.8; 521/51; 528/64

[58] Field of Search ............ 264/45.5, 45.3, DIG. 83, 264/300, 53, 54; 528/903; 521/51

[56] References Cited

U.S. PATENT DOCUMENTS

| | | |
|---|---|---|
| 2,778,810 | 1/1957 | Müller et al. |
| 3,267,050 | 8/1966 | Kuryla et al. |
| 3,428,610 | 2/1969 | Klebert .............................. 528/903 |
| 4,218,543 | 8/1980 | Weber et al. .................. 264/45.5 X |
| 4,288,564 | 9/1981 | Conover et al. ............... 264/45.3 X |
| 4,298,701 | 11/1981 | Meyborg et al. ................. 264/53 X |
| 4,303,773 | 12/1981 | Ganster et al. ...................... 521/64 |
| 4,581,386 | 4/1986 | Taylor et al. .................... 521/163 X |

FOREIGN PATENT DOCUMENTS 026915 4/1981 European Pat. Off. ..
069286 1/1983 European Pat. Off. ..

OTHER PUBLICATIONS

Knipp, Ulrich, "Plastics for Automobile Safety Bumpers" in *Journal of Cellular Plastics*, vol. 9, No. 2, Mar.-/Apr. 1973, pp. 76–84.

Prepelka, David J. and James L. Wharton, "Reaction Injection Molding in the Automotive Industry," in *Journal of Cellular Plastics*, vol. 11, No. 2, Mar./Apr. 1975, pp. 87–98.

*Primary Examiner*—Philip Anderson
*Attorney, Agent, or Firm*—William G. Conger

[57] ABSTRACT

The invention relates to a process for the preparation of cellular, microcellular and noncellular polyurethane polyurea molded parts through the reaction of organic polyisocyanates, polyols having at least 2 reactive hydrogen atoms, and a chain extender containing at least 70 percent by weight of a mixture of aromatic diamines comprising from 80 to 50 weight percent of at least one primary aromatic diamine whose amino groups are sterically hindered relative to reaction with polyisocyanates, and 20 to 50 weight percent of at least one unsubstituted or substituted reactive primary aromatic diamine whose amino groups do not exhibit reduced reactivity to polyisocyanates.

These reactive mixtures produce polyurethane polyurea polymers with excellent demoldability without the use of external mold release agents.

21 Claims, No Drawings

PROCESS FOR THE PREPARATION OF OPTIONALLY CELLULAR POLYURETHANE POLYUREA MOLDED PARTS WITH IMPROVED DEMOLDING CHARACTERISTICS

BACKGROUND OF THE INVENTION

1. Field of the Invention

The subject invention relates to a process for the preparation of polyurethane polyurea polymers by the reaction injection molding (RIM) technique without the necessity of utilizing external mold release agents. More particularly, the subject invention relates to the use, as chain extender in the RIM process, of a mixture the major proportion of which consists of a composition containing both sterically hindered primary aromatic diamines and reactive primary aromatic diamines.

2. Description of Related Art

Federal Republic of Germany published application No. 11 96 864 (U.S. Pat. No. 3,099,516) discloses the preparation of cross-linked plastics using isocyanate addition polymerization wherein hydroxyl group-containing compounds and polyisocyanates are expanded in molds in the presence of blowing agents and catalysts.

By correctly selecting the hydroxyl group-containing polyesters, polyethers, polyester amides, etc. and the organic polyisocyanates and in addition using chain extenders such as glycols or diamines, this method can be used to produce both elastic and rigid polyurethanes as well as modifications between these extremes.

Federal Republic of Germany Pat. No. 831 604 (U.S. Pat. No. 2,778,810) discloses the preparation of polyurethane elastomers from hydroxyl group-containing compounds and polyisocyanates by first preparing isocyanate group-containing prepolymers, which are then reacted in a second step with chain extenders to form higher molecular weight elastomers.

The use of diamines as chain extenders generally prohibited the use of a one-shot process for the preparation of polyurethane polyurea polymers. As disclosed in Federal Republic of Germany published application No. 11 49 523 (U.S. Pat. No. 3,105,062), crystalline, aromatic primary diamines are incorporated in the liquid, isocyanate group-containing prepolymers in less than the stoichiometric amount relative to the isocyanate groups, at a temperature less than the melting point of the diamines. The resulting mixtures are then cured by the application of heat. In Federal Republic of Germany Pat. No. 12 40 654 (U.S. Pat. No. 3,428,610), the isocyanate group-containing prepolymers are reacted at room temperature or moderately elevated temperatures with liquid or dissolved aromatic diamines which contain at least 1 linear alkyl substituent in the ortho position relative to the first amino group and two linear alkyl substituents having from 1 to 3 carbon atoms on the second amino group.

A process for the preparation of optionally cellular, elastic molded parts having a closed skin from polyurethane polyurea elastomers using the principle of reaction injection molding (RIM) is described in Federal Republic of Germany published application No. 26 22 951 (U.S. Pat. No. 4,218,543). The systems cited therein consist primarily of organic polyisocyanates, polyols, and reactive di- or polyamine chain extenders substituted by alkyl groups in the ortho position relative to the amino group. Strong catalysts for the reaction between the hydroxyl and isocyanate groups are present. In this process it is essential that the aromatic di- or polyamines are miscible in all proportions with polyols having molecular weights from 1200 to 1800. Furthermore, it is essential that the alkyl substituents must have from 1 to 3 carbon atoms; at least two of the alkyl substituents have from 2 to 3 carbon atoms; and each of the ortho positions relative to the amino groups must be substituted. Such systems may possess cream times of less than one second. With these low cream times, the transition from liquid to solid phase takes place almost instantaneously, which causes the liquid reaction mixture to solidify uniformly on the walls of the molds.

It is also known that the reactivity of aromatic amino groups can be sharply reduced relative to isocyanates through the use of electrophilic substituents. Examples of such aromatic diamines, as cited in Federal Republic of Germany Pat. No. 12 16 538 (British Pat. No. 981,935), are 3,3'-dichloro-4,4'-diaminodiphenylmethane, 3,3'-dinitro-4,4'-diaminodiphenylmethane and 3,3'-dichloro-4,4'-diaminodiphenyl. The use of such compounds is subject to expensive handling restrictions based on health and safety regulations. The use of the highly electronegative substituents in these compounds, however, reduces the reactivity of the aromatic amino groups to such a large extent that curing of the reaction injection molded parts can require up to 15 minutes, thereby making the use of this process uneconomical.

Polyurethane polyurea formulations having reduced reactivity and therefore improved flowability compared to systems prepared in accordance with Federal Republic of Germany published application No. 26 22 951 are disclosed in the specifications of European published application No. 26 915. According to this process, 3,3',5,5'-tetraalkyl substituted 4,4'-diaminodiphenylmethanes in which the alkyl radicals are the same or different and represent a methyl, ethyl, isopropyl, sec- or tert-butyl radical, and wherein at least one of the substituents must be an isopropyl or sec-butyl radical are used as the aromatic diamines. The tetraalkyl-substituted diaminodiphenylmethanes mix quite well with the polyols in the required amounts at room temperature and exhibit only slight or even no tendency to crystallize, so that the formulations are easily handled under the standard conditions for conventional RIM systems. However, it has also been found that the tetraalkyl-substituted 4,4'-diaminodiphenylmethanes may not be reactive enough for some applications.

Somewhat more reactive polyurethane polyurea formulations are described in European published application No. 69 286. Trialkyl-substituted meta-phenylenediamines are used as the aromatic diamines, wherein two of the alkyl substituents may be the same or different and are linear or branched alkyl radicals having from 1 to 4 carbon atoms while the third alkyl radical has from 4 to 12 carbon atoms or is a 5- or 6-membered cycloalkyl radical. Even with a relatively high diamine content, the formulations exhibit sufficient flowability and produce molded parts which have high dimensional stability at elevated temperature, and which do not exhibit a progressive drop in their shear modulus curves between 100° C. and 200° C.

The use of polyoxyalkylene polyamines having molecular weights from 1100 to 16,000 for the preparation of elastic polyurethane or polyurethane polyurea elastomers is disclosed in European Published application No. 81 701 and Federal Republic of Germany published applications Nos. 32 15 909 and 32 15 907.

In addition to such other important factors such as cream time and maintenance of acceptable physical properties, mold release factors are highly important. The cited processes have the disadvantage that external and/or internal release agents must be used as demolding aids when the parts are produced in standard production, since the molded parts otherwise stick to the mold and can be damaged during demolding. The use of internal release agents produces only a slight improvement in self-releasing characteristics. Even when polyoxyalkylene polyamines are used as disclosed in European published application No. 81 701, internal release agents are still required before the use of external release agents can be eliminated. If these release agents are not used, then damage to the molded part can be expected after from 5 to 10 demoldings. However, the use of external release agents makes it much more difficult or even impossible to paint the molded parts.

SUMMARY OF THE INVENTION

The object of the subject invention is to prepare elastic, optionally cellular polyurethane polyurea molded parts using reaction injection molding techniques by a process that eliminates the use of known external release agents. This objective was unexpectedly met by the use of special mixtures of both sterically hindered and highly reactive primary aromatic diamines in specific weight ratios as the amine component.

Hence, the subject of the invention is a process for the one-shot preparation of cellular, micro-cellular, or non-cellular polyurethane polyurea polymers by reaction injection molding wherein said polymer is formed through the reaction of an isocyanate, a polyol, and a chain extender, in the presence of suitable catalysts, and optionally blowing agents, additives and auxiliaries; wherein the improvement comprises selecting a chain extender containing at least 70 percent by weight relative to the total chain extender weight, of an aromatic diamine component comprising (a) from 80 to 50 percent by weight of at least one sterically hindered primary aromatic diamine whose amino groups are sterically hindered with respect to polyisocyanates by the presence of at least one alkyl substituent in the ortho position of each amino group, and (b) from 20 to 50 percent by weight of a reactive aromatic diamine selected from the group consisting of unsubstituted, primary aromatic diamines, substituted primary aromatic diamines, and mixtures thereof, wherein the amino groups of said diamines do not exhibit reduced reactivity with respect to polyisocyanates as a result of electrophilic substituents or steric hindrance, wherein the percents by weight are based on the total weight of the mixture of (a) and (b).

The process of the invention has the advantage that the use of external release agents, for example those from the group composed of silicones and waxes, is no longer necessary to treat the mold, so that the paintability of the molded parts is not adversely affected. In addition, the molded parts may be produced with short cycle times.

DESCRIPTION OF THE PREFERRED EMBODIMENTS

Typical organic polyisocyanates used in the process of the subject invention are aliphatic, cycloaliphatic, araliphatic, and preferably aromatic polyfunctional isocyanates. Specific example are: alkylene diisocyanates having from 4 to 12 carbon atoms in the alkylene radical such as 1,12-dodecane diisocyanate, 1,4-tetramethylene diisocyanate, and preferably 1,6-hexamethylene diisocyanate; cycloaliphatic diisocyanates, such as 1,3- and 1,4-cyclohexane diisocyanate and their mixtures, 1-isocyanato-3,3,5-trimethyl-5-isocyanatomethylcyclohexane (isophorone diisocyanate), 2,4- and 2,6-hexahydrotoluene diisocyanate and their mixtures, 4,4'-, 2,2'- and 2,4'-dicyclohexylmethane diisocyanate and their mixtures; and preferably, aromatic di- and polyisocyanates such as 4,4'-, 2,4'- and 2,2'-diisocyanatodiphenylmethane and their mixtures, 2,4- and 2,6-diisocyanatotoluene and their mixtures, 1,5-diisocyanatonaphthalene, polyphenyl-polymethylene polyisocyanates, 2,4,6-triisocyanatotoluene, and preferably mixtures of diphenylmethane diisocyanates and polyphenyl polymethylene polyisocyanates (polymeric MDI). These di- and polyisocyanates can be used individually or in the form of mixtures.

Frequently, modified polyfunctional isocyanates are used. Typical modified organic di- and polyisocyanates are: carbodiimide group-containing polyisocyanates in accordance with Federal Republic of Germany Pat. No. 10 92 007; allophanate group-containing polyisocyanates, for example those described in British Pat. No. 994,890, the references disclosed in Belgian Pat. No. 671,626, and in Dutch published application No. 71 02 524; isocyanurate group-containing polyisocyanates such as those described in Federal Republic of Germany Pat. Nos. 10 22 789, 12 22 067, 10 27 394 and Federal Republic of Germany published applications Nos. 19 29 034, and 20 04 048; urethane group-containing polyisocyanates such as those described in the references cited in Belgian Pat. No. 752,261, or as described in U.S. Pat. No. 3,394,164; acylated urea group-containing polyisocyanates such as those described in Federal Republic of Germany Pat. No. 12 30 778; biuret group-containing polyisocyanates such as those described in Federal Republic of Germany Pat. No. 11 01 394 and British Pat. No. 889 050; polyisocyanates prepared by means of telomerization reactions as described in the references in Belgian Pat. No. 723,640, and ester group-containing polyisocyanates as disclosed in British Pat. Nos. 965,474 and 1,072,956, in U.S. Pat. No. 3,567,765, and in Federal Republic of Germany Pat. No. 12 31 688.

Preferably though, the following are used: urethane group-containing polyisocyanates such as those prepared from isocyanates such as 4,4'- and/or 2,4'-diphenylmethane diisocyanate or toluene diisocyanate or 2,4- and/or 2,6-toluene diisocyanate by reaction with low molecular weight linear or branched alkanediols, dialkylene glycols, or polyoxyalkylene glycols having molecular weight of up to 800 prepared from ethylene oxide, 1,2-propylene oxide, or their mixtures; carbodiimide group- and/or isocyanurate ring-containing polyisocyanates, for example those derived from 4,4'-, 2,4'-diphenylmethane diisocyanate, 2,4- and/or 2,6-toluene diisocyanate, and, preferably, 4,4'-diphenylmethane diisocyanate, mixtures of 2,4'- and 4,4'-diphenylmethane diisocyanate, toluene diisocyanates, mixtures of diphenylmethane diisocyanates and polyphenyl polymethylene polyisocyanates (polymeric MDI) and mixtures of toluene diisocyanates and polymeric MDI.

Examples of isocyanate reactive polyols which may be utilized in the process of the subject invention are preferably polyols having a functionality of from 2 to 8, and more preferably from 2 to 4; and a molecular weight of from 1000 to 8000, more preferably from 1200 to 6000. By the term polyol is meant high molecular weight compounds having at least 2 reactive hydrogen atoms. For example, success has been achieved with polyether polyamines and/or preferably polyols selected from the group consisting of the polyether polyols, polyester polyols, polythioether polyols, polyesteramides, hydroxyl group-containing polyacetals, and hydroxyl group-containing aliphatic polycarbonates, or mixtures of these cited polyols. Preferably, polyester polyols, polyether polyols and their mixtures are used.

Suitable polyester polyols can be prepared, for example, from organic dicarboxylic acids having from 2 to 12 carbon atoms, preferably aliphatic dicarboxylic acids having from 4 to 6 carbon atoms, and polyfunctional alcohols, preferably diols having from 2 to 12 carbon atoms, more preferably from 2 to 6 carbon atoms. Typical dicarboxylic acids are: succinic acid, glutaric acid, adipic acid, suberic acid, azelaic acid, sebacic acid, decane dicarboxylic acid, maleic acid, and fumaric acid. The dicarboxylic acids may be used individually or in mixtures with one another. Instead of the free dicarboxylic acids, corresponding dicarboxylic acid derivatives may also be used, for example dicarboxylic acid esters of alcohols having from 1 to 4 carbon atoms, or dicarboxylic anhydrides. Preferably used are dicarboxylic acid mixtures of succinic acid, glutaric acid, and adipic acid, in proportions of 20–35:35–50:20–32 parts by weight, and in particular adipic acid. Examples of di- and polyfunctional alcohols, in particular, diols, are: ethanediol, diethylene glycol, 1,2- and 1,3-propanediol, dipropylene glycol, 1,4-butanediol, 1,5-pentanediol, 1,6-hexanediol, 1,10-decanediol. Examples of triols are glycerin and trimethylolpropane. Preferably used are ethanediol, diethylene glycol, 1,4-butanediol, 1,5-pentanediol, 1,6-hexanediol, or mixtures of two or more of the cited diols, preferably mixtures of 1,4-butanediol, 1,5-pentanediol, and 1,6-hexanediol. In addition, polyester polyols from lactones, for example ε-caprolactone, or hydroxycarboxylic acids for example ω-hydroxycaproic acid may be used. The polyester polyols preferably have a functionality of from 2 to 3 and a molecular weight of from 1000 to 3000, more preferably from 1800 to 2500.

The preferred polyols for use in the process of the subject invention are the polyether polyols. These polyols are prepared through anionic polymerization using alkali hydroxides such as sodium or potassium hydroxide, or alkali alkoxides such as sodium methoxide, sodium or potassium ethoxide, or potassium isopropoxide as catalysts. They may also be prepared by cationic polymerization with Lewis acids such as antimony pentachloride, boron trifluoride etherate, or bleaching earth as catalyst. Generally, one or more cyclic ethers having from 2 to 4 carbon atoms, and an initiator containing from 2 to 8, preferably 2 to 4, reactive hydrogen atoms are utilized in the preparation of these polyethers.

Suitable cyclic ethers are, for example: tetrahydrofuran, and alkylene oxides such as 1,3-propylene oxide, 1,2- and 2,3-butylene oxide, styrene oxide, and epichlorohydrin. Preferably ethylene oxide and 1,2 propylene oxide are utilized. The alkylene oxides may be used individually, alternately one after another, or as mixtures. Typical initiator molecules are: water, organic dicarboxylic acids such as succinic acid, adipic acid, phthalic acid, and terephthalic acid; aliphatic and aromatic optionally N-mono, N,N- and N,N'-dialkyl-substituted diamines having from 1 to 4 carbon atoms in the alkyl radical such as mono- and dialkyl-substituted ethylenediamine, diethylenetriamine, triethylenetetramine, 1,3-propylenediamine, 1,3- or 1,4-butylenediamine, 1,2-1,3-1,4-, 1,5-, 1,6-hexamethylenediamine, phenylenediamines, 2,4- and 2,6-toluenediamine, and 4,4'-, 2,4'- and 2,2'-diaminodiphenylmethanes.

Alkanolamines may also be used as the initiators, for example ethanolamine, diethanolamine, N-methyl- and N-ethylethanolamine, N-methyl- and N-ethyldiethanolamine and triethanolamine, ammonia, hydrazine and hydrazides. Preferably di- and/or trifunctional alcohols are used, for example ethanediol, 1,2- and 1,3-propanediol, diethylene glycol, dipropylene glycol, 1,4-butanediol, 1,6-hexanediol, glycerin, and trimethylolpropane. However, higher functional alcohols such as pentaerythritol, sorbitol, and sucrose may also be utilized.

The polyether polyols preferably possess molecular weights from 1000 to 8000, more preferably from 1200 to 6000, and most preferably from 1800 to 4000. As with the polyester polyols, they may be used individually or in the form of mixtures. In addition, they may be mixed with polyester polyols as well as with hydroxyl group-containing polyesteramides, polyacetals, polycarbonates, and/or polyether polyamines.

Typical hydroxyl group-containing polyacetals are those compounds which may be prepared from glycols such as diethylene glycol, triethylene glycol, 4,4'-bis[hydroxyethoxy]diphenyldimethylmethane, hexanediol and formaldehyde. Suitable polyol acetals may also be prepared through the polymerization of cyclic acetals.

The hydroxyl group-containing polycarbonates which may be used are those of the known type, which may be prepared through the reaction of diols such as 1,3-propanediol, 1,4-butanediol, and/or 1,6-hexanediol, diethylene glycol, triethylene glycol, or tetraethylene glycol with diarylcarbonates such as diphenylcarbonate, or with phos- gene.

Among the polyesteramides are those which, for example, are obtained from polyfunctional saturated and/or unsaturated carboxylic acids or their anhydrides and polyfunctional saturated and/or unsaturated amino alcohols or mixtures of polyfunctional alcohols and amino alcohols and/or polyamides. Preferably linear polyesteramides are utilized.

Suitable polyether polyamines may be prepared from the polyether polyols cited above using known methods. Typical examples are the cyanoalkylation of polyoxyalkylene polyols and the subsequent hydrogenation of the nitrile which is formed (U.S. Pat. No. 3,267,050) or the amination of the polyoxyalkylene polyols with amines or ammonia in the presence of hydrogen and catalysts (Federal Republic of Germany Pat. No. 12 15 373).

As aromatic diamine components utilized generally in amounts greater than 70 percent by weight of the chain extender in the process of the invention are mixtures comprising (a) 80 to 50 percent by weight, and preferably from 78 to 65 percent by weight, of at least one sterically hindered primary aromatic diamine whose amino groups are sterically hindered relative to reaction with di- and polyisocyanates by the presence of at least one alkyl substituent at the ortho position of each amino group; and (b) from 20 to 50 weight percent, preferably from 22 to 35 weight percent, of at least one substituted or unsubstituted reactive primary aromatic diamine whose amino groups do not exhibit reduced reactivity to polyisocyanates as a result of electrophilic substances and/or steric hindrance, the foregoing percentages by weight being based on the total weight of the mixture of (a) and (b).

Preferred Aromatic Diamine Components

Particularly well suited are primary aromatic diamine component mixtures which are liquid at room temperature and which are partially or completely miscible with the polyol component under the processing conditions.

The Sterically Hindered Primary Aromatic Diamine (a).

Sterically hindered primary aromatic diamines (a) which have been used successfully and are therefore preferred are alkyl-substituted meta-phenylenediamines as represented by the formulas below:

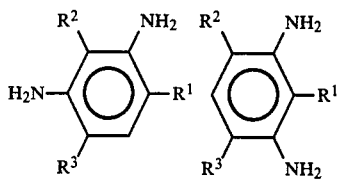

wherein $R^1$ is a hydrogen atom or a linear or branched alkyl radical having from 1 to 12, preferably 1 to 6 carbon atoms and $R^2$ and $R^3$ are identical or different alkyl radicals having from 1 to 4 carbon atoms, for example methyl, ethyl, propyl, isopropyl, butyl, or sec-butyl radicals.

Particularly suitable are those branched alkyl radicals $R^1$ in which the branching point is located at the $C_1$ carbon atom. In addition to hydrogen, the following typical alkyl radicals $R^1$ may be cited: methyl, ethyl, n- and isopropyl, butyl, hexyl, octyl, decyl, 1-methyloctyl, 2-ethyloctyl, 1-methylhexyl, 1,1-dimethylpentyl, 1,3,3-trimethylhexyl, 1-ethylpentyl, 2-ethylpentyl, and preferably the cyclohexyl, 1-methyl-n-propyl, tert-butyl, 1-ethyl-n-propyl, 1-methyl-n-butyl, and 1,1-dimethyl-n-propyl radical.

Typical alkyl substituted m-phenylenediamines are: 2,4-dimethyl-, 2,4-diethyl-, 2,4-diisopropyl-, 2,4-diethyl-6-methyl-, 2-methyl-4,6-diethyl-, 2,4,6-triethyl-, 2,4-dimethyl-6-cyclohexyl-, 2-cyclohexyl-4,6-diethyl-, 2-cyclohexyl-2,6-diisopropyl-, 2,4-dimethyl-6-(1-ethyl-n-propyl)-, 2,4-dimethyl-6-(1,1-dimethyl-n-propyl)-, and 2-(1-methyl-n-butyl)-4,6-dimethyl-1,3-phenylenediamines.

In addition, alkyl-substituted diaminodiphenylmethanes, have also proven to be successful, for example, 3,3'-di- and 3,3',5,5'-tetra-n-alkyl substituted 4,4'-diaminodiphenylmethanes such as 3,3'-diethyl-, 3,3',5,5'-tetraethyl- and 3,3',5,5'-tetra-(n-propyl)-4,4'-diaminodiphenylmethane.

Preferably used are diaminodiphenylmethanes of formula

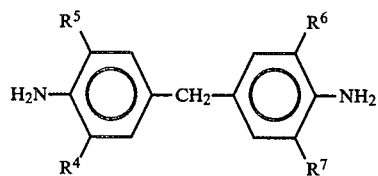

in which $R^4$, $R^5$, $R^6$ and $R^7$ are the same or different and may represent ethyl, propyl, isopropyl, sec-butyl, or tert-butyl radicals, whereby at least one of the radicals must be an isopropyl or sec-butyl radical. The alkyl-substituted 4,4'-diaminodiphenylmethanes can also be used as mixtures with isomers having formulas

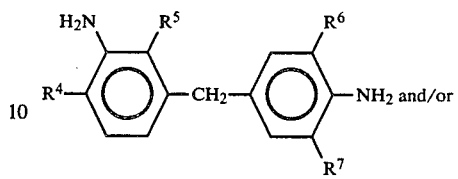

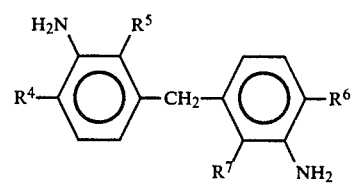

where $R^4$, $R^5$, $R^6$, and $R^7$ have the meaning stated above.

Typical examples are: 3,3',5-trimethyl-5'-isopropyl-, 3,3',5-triethyl-5'-isopropyl-, 3,3',5-trimethyl-5'-sec-butyl-, 3,3',5-triethyl-5'-sec-butyl-4,4'-diaminodiphenylmethanes. 3,3'-dimethyl-5-5'-diisopropyl-, 3,3'-diethyl-5,5'-diisopropyl-, 3,3'-dimethyl-5,5'-bis[sec-butyl]-, 3,3'-diethyl-5,5'-bis[sec-butyl]-, 3,5-dimethyl-3',5'-diisopropyl-, 3,5-diethyl-3',5'-diisopropyl-, 3,5-dimethyl-3',5'-bis[sec-butyl]-, 3,5-diethyl-3',5'-bis[sec-butyl]-4,4'-diaminodiphenylmethanes. 3-methyl-3',5,5'-triisopropyl-, 3-ethyl-3',5,5'-triisopropyl-, 3-methyl-3'5,5'-tri-sec-butyl-, 3-ethyl-3',5,5'-tris(sec-butyl)-4,4'-diaminodiphenylmethane, 3,3'-diisopropyl-5,5'-bis[sec-butyl]-3,5-diisopropyl-, 3,5'-bis[sec-butyl]-, 3-ethyl-5-sec-butyl-3',5'-diisopropyl-, 3-methyl-5-tert-butyl-3',5'-diisopropyl-, 3-ethyl-5-sec-butyl-3'-methyl-5'-tert-butyl-, 3,3',5,5'-tetraisopropyl- and 3,3',5,5'-tetrakis(sec-butyl)-4,4'-diaminodiphenylmethane.

The following primary aromatic diamines (a) are preferably used: 2,4-diethyl-, 2,4-dimethyl-1,3-phenylenediamines; 2,4-diethyl-6-methyl-, 2-methyl-4,6-diethyl-1,3-phenylenediamines; 2,4,6-triethyl-1,3-phenylenediamine; 2,4-dimethyl-6-tert-butyl-, 2,4-dimethyl-6-isooctyl-, and 2,4-dimethyl-6-cyclohexyl-1,3-phenylenediamine, 3,5-dimethyl-3',5'-diisopropyl- and 3,3',5,5'-tetraisopropyl-4,4'-diaminodiphenylmethane.

The sterically hindered primary aromatic diamines (a) can be utilized individually or in the form of mixtures, for example mixtures of alkyl-substituted 1,3-phenylenediamines, 3,3'-di- and/or 3,3',5,5'-tetraalkyl-substituted 4,4'-diaminodiphenylmethanes. In addition, the primary aromatic diamines can be mixed with a maximum of 50 percent by weight, based on the total weight of the (a) component, of primary alkyl-substituted aromatic tri- to pentamines, such as polyphenyl polymethylene polyamines, whereby the aromatic polyamines are substituted with an alkyl radical in at least one ortho position relative to the amino groups.

The Reactive Primary Aromatic Diamine (b)

Preferably, unsubstituted primary aromatic diamines are used as the reactive (b) aromatic diamine. However, substituted primary aromatic diamines are also suitable, preferably monoalkyl-substituted aromatic diamines in which the reactivity of the amino groups is not negatively affected by the substituents. Specifically, typical examples are: 1,2-, 1,3-, and 1,4-phenylenediamine, benzidine, 4,4'- and 2,4'-diaminodiphenylmethane, 4,4'-diaminodiphenyl ether, 1,5-diaminonaphthalene, 1,8-diaminonaphthalene, 3,4-, 2,4-, and 2,6-toluenediamine. The aromatic diamines of the (b) component may, like the aromatic diamines of the (a) component, be used individually or as mixtures. Preferably, 2,4- and/or 2,6-toluenediamine are used, more preferably 1,3-phenylenediamine.

Preferably mixtures (a) of from 80 to 50 percent by weight of 2,4-dimethyl-6-tert-butyl-1,3-phenylenediamine, 2,4-diethyl-6-methyl- and/or 2-methyl-4,6-diethyl-1,3-phenylenediamine and (b) from 20 to 50 percent by weight 1,3-phenylenediamine are used as the aromatic diamine component wherein these percents by weight are based on the total weight of the mixture of components (a) and (b).

The aromatic diamine component mixture is used in the process of the invention in amounts from 5 to 50 parts by weight, preferably from 10 to 40 parts by weight and more preferably from 15 to 30 parts by weight, based on 100 parts by weight of the polyol component.

In some instances it may be desirable, especially when preparing cellular polyurethane polyurea molded parts, to partially replace the primary aromatic diamine component mixture with other chain extenders and/or cross-linking agents. These chain extenders and cross-linking agents, hereinafter referred to as "optional chain extenders," preferably have molecular weights less than 500, more preferably from 30 to 400, and they preferably have two active hydrogen atoms. Typical examples are aliphatic and/or araliphatic diols having from 2 to 14, preferably from 2 to 6 carbon atoms, such as 1,3-propanediol, 1,10-decanediol, diethylene glycol, dipropylene glycol, bis[2-hydroxyethyl]hydroquinone, and preferably ethylene glycol, 1,4-butanediol, and 1,6-hexanediol, and triols such as glycerin and trimethylolpropane. Low-molecular-weight polyoxyalkylene polyols based on ethylene oxide and/or propylene oxide adducts of the previously noted initiators; and sec-aromatic diamines, of which typical examples are: N,N'-dialkyl-substituted aromatic diamines, which may optionally be substituted by alkyl radicals on the aromatic ring, said alkyl radicals having from 1 to 20, preferably 1 to 4 carbon atoms in the N-alkyl radical, such as N,N'-diethyl-, N,N'-bis[sec-pentyl]-, N,N'-bis[sec-hexyl]-, N,N'-bis[sec-decyl]-, N,N'-dicyclohexyl- p- or -m-phenylenediamines; N,N'-dimethyl-, N,N'-diethyl-, N,N'-diisopropyl-, N,N'-bis[sec-butyl]-, N,N'-dicyclohexyl-4,4'-diaminodiphenylmethanes; and N,N'-bis[sec-butyl]benzidine may also be used as optional chain extenders.

The optional chain extenders may be used individually or in the form of mixtures. If the total chain extender mixture, in addition to the aromatic diamine component, contains these optional chain extenders, then the mixtures preferably contain from 1 to 40, more preferably from 5 to 20 parts by weights of the optional chain extender per 100 parts by weight of the aromatic diamine component (a) and (b).

As the preferred catalysts, those compounds are used which greatly accelerate the reaction of the hydroxyl group-containing polyols and hydroxyl group-containing optional chain extenders with the polyisocyanates. Included are organometallic compounds, preferably organic tin compounds such as tin(II) salts of organic carboxylic acids such tin(II) acetate, tin(II) octoate, tin(II) ethylhexoate and tin(II) laurate, and the dialkyl tin(IV) salts of organic carboxylic acids such as dibutyl tin diacetate, dibutyl tin dilaurate, dibutyl tin maleate and dioctyl tin diacetate. The organometallic compounds are used alone or preferably in combination with strongly basic amines, typical examples of which are amidines such as 2,3-dimethyl-3,4,5,6-tetrahydropyrimidine; tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, pentamethyldiethylenetriamine, tetramethyldiaminoethyl ether, bis[dimethylaminopropyl]urea, dimethylpiperazine, 1,2-dimethylimidazole, 1-aza-bicyclo[3.3.0]octane, and preferably 1,4-diaza-bicyclo[2.2.2]octane; and alkanol compounds such as triethanolamine, triisopropanolamine, N-methyl- and N-ethyldiethanolamine, and dimethylethanolamine.

Typical catalysts are also: tris(dialkylaminoalkyl)-s-hexahydrotriazines, in particular tris (N,N-dimethylaminopropyl)-s-hexahydrotriazine; tetraalkyl ammonium hydroxides such as tetramethylammonium hydroxide, alkali hydroxides, such as sodium hydroxide and alkali alkoxides, such as sodium methoxide and potassium isopropoxide, and alkali salts of long-chain fatty acids having 10 to 20 carbon atoms and optionally side-positioned hydroxyl groups. Preferably used are from 0.001 to 5 percent by weight, more preferably 0.05 to 2 percent by weight of catalyst or catalyst combinations, based on the weight of the polyol component.

Among the blowing agents which may optionally be used in the process of the invention is water, a "reactive" blowing agent which reacts with isocyanate groups to form carbon dioxide. The amounts of water which are preferably used range from 0.5 to 2 percent by weight based on the weight of the polyol component.

Other blowing agents which may be used are low-boiling-point liquids, which vaporize as a result of the exothermic nature of the polyaddition reaction. Suitable blowing agents are those which are inert to the organic polyisocyanate and which having boiling points under 100° C. Examples of such preferably used liquids include halogenated hydrocarbons such as methylene chloride, trichlorofluoromethane, dichlorodifluoromethane, dichloromonofluoromethane, dichlorotetrafluoroethane, and 1,1,2-trichloro-1,2,2-trifluoroethane. Mixtures of these low-boiling-point liquids with one another and/or with other substituted or unsubstituted hydrocarbons may also be used as blowing agents.

The most desirable amount of low-boiling-point liquid to use in preparing cellular polyurethane polyurea molded objects depends on the density which is desired as well as on whether water is also used. Generally, amounts from 0.5 to 15 parts by weight based on 100 parts by weight of the polyol component produces satisfactory results.

Auxiliaries and additives can also be incorporated in the reaction mixture. Typical examples well known to those skilled in the art are surfactants, foam stabilizers, cell regulators, fillers, colorants, pigments, flame retardants, agents to protect against hydrolysis, fungistats, and bacteriostats.

Surfactants which may be used are those compounds which are used to support the homogenation of the basic components and which may also be suitable for controlling cell structure. Typical examples are emulsifiers such as the sodium salts of castor oil sulfates or of fatty acids: salts of fatty acids with amines, for example oleic acid diethylamine or stearic acid diethanolamine; salts of sulfonic acids, for example alkali or ammonium salts of dodecylbenzene- or dinaphthylmethanedisulfonic acid; and ricinoleic acid. Foam stabilizers which may be used are, for example, siloxane oxalkylene heteropolymers and other organic polysiloxanes; oxyethylated alkyl phenols, oxyethylated fatty alcohols; paraffin oils, castor oil or ricinoleates and Turkey red oil. Examples of cell regulators which may be used are paraffins, fatty alcohols, and dimethylpolysiloxanes. The surfactants, foam stabilizers, and cell regulators are generally used in amounts ranging from 0.01 to 5 parts by weight based on 100 parts by weight of the polyol component.

The fillers which may be used, in particular reinforcing fillers, include conventional organic and inorganic fillers, reinforcing agents, weight-increasing agents, agents to improve paint wear, coating agents, etc. Typical examples are: inorganic fillers such as silicate minerals, for example lamellar silicates such as antigorite, serpentine, hornblendes, amphibole, chrysotile, talcum; metal oxides such as kaolin, aluminum oxide, titanium oxides, and iron oxides; metal salts such as chalk and barium sulfate; inorganic pigments such as cadmium sulfide and zinc sulfide; and glass, asbestos powder, etc. Preferably used are kaolin (China clay), aluminum silicate, coprecipitates of barium sulfate and aluminum silicate, and natural and synthetic fibrous minerals such as asbestos, and wollastonite. In particular, glass fibers of varying lengths, which may optionally also be treated with a size may be used. Typical organic fillers are: coal, melamine, pine resin, cyclopentadienyl resins and graft polymers based on styrene and acrylonitrile, prepared by means of in situ polymerization of acrylonitrile/styrene mixtures in polyether polyols using methods similar to those described in German Patent documents Nos. 11 11 394, 12 22 669, (U.S. Pat. Nos. 3,304,273; 3,383,351; 3,523,093), 11 52 536 (British Pat. No. 1,040,452), and 11 52 537 (British Pat. No. 987,618), and which may thereafter be aminated, as well as filler polyoxyalkylene polyols or polyamines, in which aqueous polymer dispersions are utilized to form polyoxyalkylene polyol or polyamine dispersions.

The inorganic and organic fillers can be used individually or as mixtures. Preferably used are stable filler/polyoxyalkylene polyol dispersions in which the fillers are reduced in size to less than 7 μm in situ in the presence of polyoxyalkylene polyols at high localized energy densities and which are simultaneously dispersed by this action. The inorganic and organic fillers are incorporated into the reaction mixture, preferably in amounts ranging from 0.5 to 50 weight percent, more preferably from 1 to 40 weight percent based on the weight of the isocyanate, polyol and chain extender components.

Suitable flame retardants are tricresyl phosphate, tris[2-chloroethyl]phosphate, tris[chloropropyl]phosphate, and 2,3-dibromopropylphosphate. In addition to the halogen-substituted phosphates cited above, inorganic flame retardants may also be used to make the molded object flame resistant, for example hydrated aluminum oxide, antimony trioxide, arsenic oxide, ammonium polyphosphate, and calcium sulfate. Generally, it is preferable to use from 5 to 50 parts by weight, more preferably from 5 to 25 parts by weight, of the cited flame retardants per 100 parts by weight of the polyol component.

Further information on these conventional auxiliaries and additives is found in the literature, in particular in the monograph by J. H. Sanders and K. C. Frisch, *Polyurethanes*, pt. 1 and 2, in *High Polymers* vol. XVI, Interscience Publishers 1962, 1964.

In order to prepare the optionally cellular polyurethane polyurea molded objects, the organic polyisocyanates, polyols containing at least two reactive hydrogen atoms, and chain extender containing at least 70 percent by weight of aromatic diamines (a) and (b) and up to 30 percent by weight optional chain extenders, are reacted in such amounts that the equivalent ratio of isocyanate groups in the polyisocyanates to the sum of reactive hydrogen atoms in the polyol and chain extender components is from 1:0.85 to 1:1.25, preferably from 1:0.95 to 1:1.15.

The preparation of cellular micro-cellular and non-cellular polyurethane polyurea molded objects may be accomplished using a prepolymer process. Preferably, however, a one-shot process utilizing the reaction injection molding technique is utilized. This process is described, for example, by Piechota and Röhr in *Integralschaumstoff*, Munich, Vienna: Carl-Hanser-Verlag, 1975; D. J. Prepelka and J. L. Wharton in *Journal of Cellular Plastics*, March-April 1975;87-98, and U. Knipp, *Journal of Cellular Plastics*, March-April 1973:76-84.

When using a mixing chamber with several feed nozzles, the basic components can be added individually and mixed intensively in the mixing chamber. It has proven to be particularly advantageous to use a two-component process and to dissolve the primary aromatic diamine component and optional chain extenders in the polyol, along with any blowing agents, auxiliaries and additives to form the so-called "(A)" component. The organic polyisocyanates, modified polyisocyanates and/or isocyanate prepolymers are then used as the so-called "(B)" component. Here the advantage is that, for example, the (A) and (B) components can be stored separately and can be transported in a space-saving manner, so that they only need to be mixed together in the proper amounts for processing.

The amount of reaction mixture charged to the mold is measured out such that the resulting microcellular or noncellular molded parts have densities of from 1.0 to 1.4 g/cm$^3$, preferably from 1.0 to 1.2 g/cm$^3$, and cellular molded parts have densities of from 0.8 to 1.2 g/cm$^3$, preferably from 0.8 to 1.0 g/cm$^3$. The basic components are charged into the mold at a temperature of from 15° C. to 80° C., preferably from 20° C. to 55° C. Suitable mold temperatures are from 20° C. to 90° C., preferably from 30° C. to 75° C. The degree of compression for preparing microcellular or cellular molded parts ranges from 1.1 to 8, preferably from 2 to 8.

The dense non-cellular or microcellular polyurethane polyurea molded objects obtained by the process of the invention are particularly suitable for use in the automobile industry, for example as bumper fascias, impact-protection molding, and body parts such as rain gutters, fenders, spoilers, and wheel well extensions. They may also be used for producing plastic housings, rollers, and shoe soles. The cellular foams are used, for example, as arm rests, head supports, and safety padding in automotive interiors as well as for motorcycle and bicycle seats and for cover layers in foam laminate applications.

The examples which follow serve to illustrate the process of the subject invention. The parts cited in the examples are parts by weight.

EXAMPLE 1

(A) Component: A mixture composed of 81.0 parts by weight of a conventional polyether polyol having a hydroxyl number of 26, prepared through the addition of 1,2-propylene oxide and the subsequent addition of ethylene oxide to trimethylolpropane; 12.6 parts by weight of the sterically hindered primary aromatic diamine (a) 1,3-dimethyl-5-tert-butyl-2,4-diaminobenzene, 5.2 parts by weight of the reactive primary aromatic diamine (b) 1,3-phenylenediamine; 0.33 parts by weight of 1,4-diazabicyclo[2.2.2] octane, and 0.1 parts by weight of dibutyl tin dilaurate as catalysts.

(B) Component: 48 parts by weight of a mixture composed of polyoxypropylene glycol-modified and carbodiimide-modified 4,4'-diphenylmethane diisocyanate having an isocyanate content of 26.5 percent by weight.

The (A) and (B) components were heated to 50° C. and utilized in a reaction injection molding process on an Elastogran-Maschinenbau Puromat® 30 high pressure metering system in an aluminum mold, which was temperature controlled to from 30° C. to 40° C., having internal dimensions of 4×200×300 mm, to produce molded boards. No external release agents were utilized. The mold close time was 30 seconds.

Production of the molded parts was terminated after the preparation of 25 molded boards showed no adhesion of the molded parts to the mold. The resulting molded boards had the following physical properties:

| Density per DIN 53 420 | 1.1 g/cm$^3$ |
| --- | --- |
| Shore D hardness per DIN 53 505 | 61 |
| Tensile strength DIN 53 504 | 28.0 N/mm$^2$ |
| Elongation per DIN 53 504 | 280% |
| Tear strength (bar) per DIN 53 507 | 28.7 N/mm |
| Heat sag 1 hr. at 120° C. | 1.0 mm |

EXAMPLE 2

(A) Component: A mixture composed of 81.0 parts by weight of the polyether polyol of Example I; 12.0 parts by weight of 1,3-dimethyl-5-tert-butyl-2,4-diaminobenzene, 6.2 parts by weight 2,4-toluenediamine; 0.33 parts by weight of 1,4-diazabicylo-[2.2.2]octane and 0.1 parts by weight dibutyl tin dilaurate as catalysts.

(B) Component: as in Example 1.

The molded boards were prepared according to specifications in Example 1. Since no adhesion to the mold was observed after 25 molded boards were produced, the preparation of molded parts was terminated. The resulting molded boards had the following physical properties:

| Density per DIN 53 420 | 1.07 g/cm$^3$ |
| --- | --- |
| Shore D hardness per DIN 53 505 | 60 |
| Tensile strength DIN 53 504 | 29.6 N/mm$^2$ |
| Elongation per DIN 53 504 | 275% |
| Tear strength (bar) per DIN 53 507 | 30 N/mm |
| Heat sag 1 hr. at 120° C. | 1.2 mm |

EXAMPLE 3

(A) Component: A mixture composed of 80.3 parts by weight of the polyether polyol of Example I; 13.4 parts by weight of a mixture of 1-methyl-3,5-diethyl-2,4- and 2,6-diaminobenzene in a weight ratio of 80:20, 5.2 parts by weight 1,3-phenylenediamine; and 0.33 parts by weight, 1,4-diazabicylo-[2.2.2]octane, and 0.1 parts by weight dibutyl tin dilaurate as catalysts.

(B) Component: 51 weight parts of the mixture of Example 1.

The molded boards were prepared according specifications in Example 1. Since no adhesion to the mold was observed after 25 molded boards were produced, the preparation of molded parts was terminated. The resulting molded boards had the following physical properties:

| Density per DIN 53 420 | 1.08 g/cm$^3$ |
| --- | --- |
| Shore D hardness per DIN 53 505 | 59 |
| Tensile strength DIN 53 504 | 28.0 N/mm$^2$ |
| Elongation per DIN 53 504 | 260% |
| Tear strength (bar) per DIN 53 507 | 27 N/mm |
| Heat sag 1 hr. at 120° C. | 1.4 mm |

The embodiments of the invention in which an exclusive privilege or property is claimed are defined as follows:

1. In a process for the one-shot preparation of a cellular, microcellular, or non-cellular polyurethane polyurea polymer by reaction injection molding wherein said polymer is formed through the reaction of an isocyanate, a polyol and a chain extender, in the presence of suitable catalysts and optionally, blowing agents, additives, and auxiliaries, the improvement comprising selecting a chain extender containing in excess of 70 percent by weight relative to the total chain extender weight, of an aromatic diamine component comprising
   (a) from 80 to 50 percent by weight of at least one sterically hindered primary aromatic diamine whose amino groups are sterically hindered with respect to reaction with polyisocyanates by the presence of at least one alkyl substituent in the ortho position of each amino group, and
   (b) from 20 to 50 percent by weight of a reactive aromatic diamine selected from the group consisting of unsubstituted, primary aromatic diamines, substituted primary aromatic diamines, and mixtures thereof, wherein the amino groups of said diamines do not exhibit any reduced reactivity with respect to polyisocyanates as a result of electrophilic substituents and/or steric hindrance,
wherein the foregoing percents by weight are based on the total weight of mixture of (a) and (b).

2. Process of claim 1 wherein said sterically hindered primary aromatic diamine (a) is selected from the group consisting of

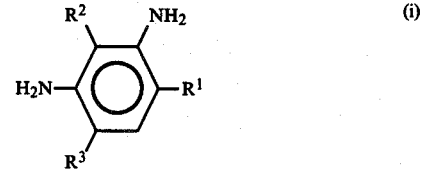

(i)

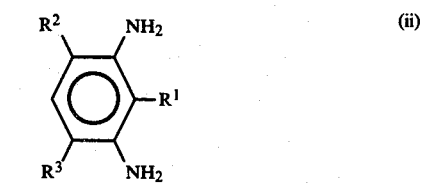

(ii)

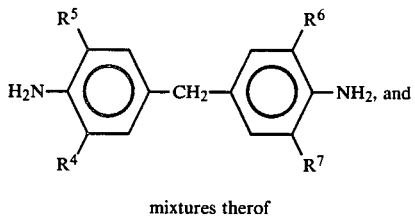

mixtures therof (iv)

wherein $R^1$ is a hydrogen atom or a linear or branched alkyl radical having from 1 to 12 carbon atoms, and $R^2$ and $R^3$ are identical or different, linear or branched alkyl radicals having from 1 to 4 carbon atoms and wherein $R^4$, $R^5$, $R^6$ and $R^7$ are identical or different and represent a methyl, ethyl, propyl, isopropyl, sec-butyl, or tert.-butyl radical, wherein, however, at least one of the radicals must be an isopropyl or sec-butyl radical.

3. The process of claim 1 wherein the sterically hindered primary aromatic diamine (a) is selected from the group consisting of 2,4-diethyl-, 2,4-dimethyl-1,3-phenylenediamine, 2,4-diethyl-6-methyl-, 2-methyl-4,6-diethyl-1,3-phenylenediamine, 2,4,6-triethyl-1,3-phenylenediamine, 2,4-dimethyl-6-tert-butyl-, 2,4-dimethyl-6-isooctyl-, 2,4-dimethyl-6-cyclohexyl-1,3-phenylenediamine, 3,5-dimethyl-3',5'-diisopropyl-4,4'-diaminodiphenylmethane, 3,3',5,5'-tetraisopropyl-4,4'-diaminodiphenylmethane, and mixtures thereof.

4. The process of claim 1 wherein the unsubstituted or substituted reactive aromatic diamines (b) are slected from the group consisting of 1,3-phenylenediamine, 2,4-toluenediamine, 2,6-toluenediamine, and mixtures thereof.

5. The process of claim 1 wherein said aromatic diamine component comprises 80 to 50 weight percent of a sterically hindered primary aromatic diamine (a) selected from the group consisting of 2,4-dimethyl-6-tert-butyl-1,3-phenylenediamine, 2,4-diethyl-6-methyl-, 2-methyl-4,6-diethyl-1,3-phenylenediamine, and mixtures thereof, and (b) from 20 to 50 weight percent of a reactive primary aromatic diamine which is 1,3-phenylenediamine, wherein the weight percents are based on the total weight of (a) plus (b).

6. The process of claim 1 wherein said polyol has a functionality of from 2 to 8 and a molecular weight of from 1000 to 8000.

7. The process of claim 1 wherein said polyol is selected from the group consisting of polyoxyalkylene polyether polyols, polyester polyols, polyester ether polyols, polythioether polyols, polyesteramides, hydroxyl group-containing polyacetals, hydroxyl group-containing aliphatic polycarbonates, and mixtures thereof.

8. The process of claim 1 wherein 50 to 100 parts by weight of chain extender are utilized per 100 parts of polyol, and wherein the equivalent ratio of isocyanate groups in the isocyanate to reactive hydrogen atoms in said polyol and chain extender is from 1:0.85 to 1:1.25.

9. The process of claim 1 wherein said chain extender contains up to 30 percent by weight relative to the total chain extender weight of an optional chain extender selected from the group consisting of
(i) aliphatic diols having from 2 to 14 carbon atoms,
(ii) aliphatic triols having from 2 to 14 carbon atoms,
(iii) arylaliphatic diols having from 2 to 14 carbon atoms,
(iv) arylaliphatic triols having from 2 to 14 carbon atoms, and
(v) mixtures thereof.

10. The process of claim 1 wherein said chain extender contains up to 30 percent by weight relative to the total chain extender weight of an optional chain extender which is an N,N'-dialkyl aromatic diamine.

11. In a process for the one-shot preparation of a cellular, microcellular, or non-cellular polyurethane polyurea by reaction injection molding wherein said polymer is formed through the reaction of an isocyanate, a polyol and a chain extender, in the presence of suitable catalysts and optionally, blowing agents, additives, and auxiliaries, the improvement comprising selecting a chain extender containing in excess of 70 percent by weight relative to the total chain extender weight, of an aromatic diamine component comprising
(a) from 78 to 65 percent by weight of at least one sterically hindered primary aromatic diamine whose amino groups are sterically hindered with respect to reaction with polyisocyanates by the presence of at least one alkyl substituent in the ortho position of each amino group, and
(b) from 22 to 35 percent by weight of a reactive aromatic diamine selected from the group consisting of unsubstituted, primary aromatic diamines, substituted primary aromatic diamines, and mixtures thereof, wherein the amino groups of said diamines do not exhibit any reduced reactivity with respect to polyisocyanates as a result of electrophilic substituents and/or steric hindrance,
wherein the percents by weight are based on the total weight of mixtures (a) and (b).

12. Process of claim 11 wherein said sterically hindered primary aromatic diamine (a) is selected from the group consisting of

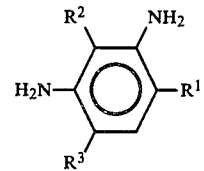

(i)

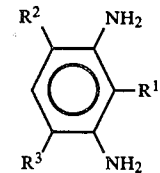

(ii)

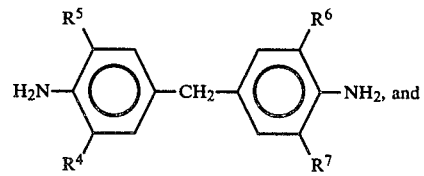

(iii)

mixtures therof (iv)

wherein $R^1$ is a hydrogen atom or a linear or branched alkyl radical having from 1 to 12 carbon atoms, and $R^2$ and $R^3$ are identical or different, linear or branched alkyl radicals having from 1 to 4 carbon atoms and wherein $R^4$, $R^5$, $R^6$ and $R^7$ are identical or different and represent a methyl, ethyl, propyl, isopropyl, sec-butyl, or tert-butyl radical, wherein, however, at least one of the radicals must be an isopropyl or sec-butyl radical.

13. The process of claim 11 wherein the sterically hindered primary aromatic diamine (a) is selected from the group consisting of 2,4-diethyl-, 2,4-dimethyl-1,3-phenylenediamine, 2,4-diethyl-6-methyl-, 2-methyl-4,6-diethyl-1,3-phenylenediamine, 2,4,6-triethyl-1,3-phenylenediamine, 2,4-dimethyl-6-tert-butyl-, 2,4-dimethyl-6-isooctyl-, 2,4-dimethyl-6-cyclohexyl-1,3-phenylenediamine, 3,5-dimethyl-3',5'-diisopropyl-4,4'-diaminodiphenylmethane, 3,3',5,5'-tetraisopropyl-4,4'-diaminodiphenylmethane, and mixtures thereof.

14. The process of claim 11 wherein the reactive aromatic diamines (b) are selected from the group consisting of 1,3-phenylenediamine, 2,4-toluenediamine, 2,6-toluenediamine, and mixtures thereof.

15. The process of claim 11 wherein said chain extender comprises 80 to 50 weight percent of a sterically hindered primary aromatic diamine (a) selected from the group consisting of 2,4-dimethyl-6-tert-butyl-1,3-phenylenediamine, 2,4-diethyl-6-methyl-2-methyl-4,6-diethyl-1,3-phenylenediamine, and mixtures thereof, and (b) from 20 to 50 weight percent of a reactive primary aromatic diamine which is 1,3-phenylenediamine, wherein the weight percents are based on the total weight of (a) plus (b).

16. The process of claim 11 wherein said polyol has a functionality of from 2 to 8 and a molecular weight of from 1000 to 8000.

17. The process of claim 11 wherein said polyol is selected from the group consisting of polyoxyalkylene polyether polyols, polyester polyols, polyester ether polyols, polythioether polyols, polyesteramides, hydroxyl group-containing polyacetals, hydroxyl group-containing aliphatic polycarbonates, and mixtures thereof.

18. The process of claim 11 wherein 50 to 100 parts by weight of chain extender are utilized per 100 parts of polyol, and wherein the equivalent ratio of isocyanate groups in the isocyanate to reactive hydrogen atoms in said polyol and chain extender is from 1:0.85 to 1:1.25.

19. The process of claim 1 wherein said chain extender contains up to 30 percent by weight relative to the total chain extender weight of an optional chain extender selected from the group consisting of
    (i) aliphatic diols having from 2 to 14 carbon atoms,
    (ii) aliphatic triols having from 2 to 14 carbon atoms,
    (iii) arylaliphatic diols having from 2 to 14 carbon atoms,
    (iv) arylaliphatic triols having from 2 to 14 carbon atoms, and
    (v) mixtures thereof.

20. The process of claim 11 wherein said chain extender contains up to 30 percent by weight relative to the total chain extender weight of an optional chain extender which is an N,N'-dialkyl aromatic diamine.

21. A polymer prepared by the process of claim 1.

* * * * *